US008164807B2

(12) United States Patent
Okawa

(10) Patent No.: US 8,164,807 B2
(45) Date of Patent: Apr. 24, 2012

(54) IMAGE RECORDING APPARATUS AND CONTROL METHOD FOR SAME

(75) Inventor: Kenichi Okawa, Tokyo (JP)

(73) Assignee: Riso Kagaku Corporation, Tokyo (JP)

( * ) Notice: Subject to any disclaimer, the term of this patent is extended or adjusted under 35 U.S.C. 154(b) by 525 days.

(21) Appl. No.: 12/468,991

(22) Filed: May 20, 2009

(65) Prior Publication Data

US 2009/0290201 A1 Nov. 26, 2009

(30) Foreign Application Priority Data

May 23, 2008 (JP) ................................. 2008-135084

(51) Int. Cl.
*H04N 1/04* (2006.01)

(52) U.S. Cl. ....... 358/502; 358/1.14; 358/1.15; 358/474

(58) Field of Classification Search .................. 358/502, 358/1.14, 1.15, 474
See application file for complete search history.

(56) References Cited

U.S. PATENT DOCUMENTS 6,970,277 B1 * 11/2005 Makishima .................. 359/238
2003/0068170 A1 * 4/2003 Burkes et al. .................. 399/72
2008/0112007 A1 * 5/2008 Yamada et al. .............. 358/1.15

FOREIGN PATENT DOCUMENTS

JP 08-133495 A 5/1996

* cited by examiner

*Primary Examiner* — Houshang Safaipour
(74) *Attorney, Agent, or Firm* — Holtz, Holtz, Goodman & Chick, PC

(57) ABSTRACT

An image recording apparatus, comprising: an image recording unit which has a recording head for recording process to a recording medium; a transport mechanism which transports the recording medium; an ascent/descent mechanism which comprises an ascent/descent drive unit used for moving the transport mechanism between a recording position to a retract position; a bumping unit which is constituted by a bumping member and a bumped member and which bumps the present bumping member to the bumped member, thereby balancing the transport mechanism; a balance detection unit for detecting the balance of the transport mechanism; and an ascent/descent control unit which judges whether or not a bumping process for balancing the transport mechanism by means of the bumping unit is to be carried out on the basis of the detection result of the balance detection unit when the transport mechanism is moved from the retract position to the recording position.

12 Claims, 12 Drawing Sheets

IMAGE RECORDING APPARATUS AND CONTROL METHOD FOR SAME

CROSS REFERENCE TO RELATED APPLICATIONS

This application claims the benefit of Japan Patent Application No. 2008-135084 filed May 23, 2008, the contents of which are incorporated by this reference.

BACKGROUND OF THE INVENTION

1. Field of the Invention

The present invention relates to a technique related to an image recording apparatus comprising a cable suspension type ascent/descent mechanism ascending or descending by means of winding or unwinding a cable, and in particular to a technique for controlling an ascent/descent mechanism, the control being performed in the operation for bumping the transport mechanism of the image recording apparatus against a recording position.

2. Description of the Related Art

An image recording apparatus which comprises a cable suspension type ascent/descent mechanism and which is capable of moving the position of a transport mechanism when an image recording is not performed or a maintenance work is carried out is known.

Such an image recording apparatus employs a wire, which is an example of a cable, to suspend an ascent/descent table used for mounting a transport mechanism (noted as “elevator table” hereinafter), which is used for transporting a recording medium by means of a belt or belts. Further, the transport mechanism body is made to ascend and descend by winding and unwinding, respectively, a pulley that is connected to a wire and driven by a motor. Further, the control is such that the transport mechanism is made to ascend so as to lift a recording medium close to a recording head when a recording process is carried out, while the transport mechanism is made to descend when the recording process is riot performed.

Reference patent document 1 (i.e., Laid-Open Japanese Patent Application Publication No. H08-133495) has disclosed a sheet transportation apparatus with a cable suspension type ascent/descent mechanism and an ascending/descending method used for an image recording apparatus.

The image forming apparatus disclosed in patent document 1 comprises an ascent/descent wire 53 connected to an ascent/descent tray 52 as shown in FIG. 1, so that an ascent/descent motor (not shown in a drawing herein) winding or unwinding the ascent/descent wire 53 causes the ascent/descent tray 52 to ascend or descend.

A sheet face sensor 54 is provided for detecting the upper limit position of the ascent/descent tray 52 so that an ascent/descent control unit (not shown in a drawing herein) stops the not-shown ascent/descent motor so as to stop the ascent/descent tray 52 when the sheet face sensor 54 detects a recording medium 51 stacked on the ascent/descent tray 52. The present stop position is the upper limit position.

Further, patent document 1 has also disclosed an ascending operation suppression method that is applied when an ascending operation for the ascent/descent tray 52 runs out of control. The image forming apparatus according to patent document 1 is equipped with a stopper member 55 at a position further above the aforementioned upper limit position so as to cause the ascent/descent tray 52 to bump the stop member 55, thereby stopping the ascending operation.

SUMMARY OF THE INVENTION

The present image recording apparatus comprises at least: an image recording unit having a recording head for performing a recording process by jetting ink to a recording medium; a transport mechanism which mounts and transports the recording medium; an ascent/descent mechanism which comprises an ascent/descent drive unit used for moving, by means of winding or unwinding a cable, the transport mechanism between a recording position to which it is moved when the image recording unit performs the recording process and at least one retract position; a bumping unit which constituted by a bumping member and a bumped member and which bumps the present bumping member to the bumped member, thereby balancing the transport mechanism; a balance detection unit which detects the balance of the transport mechanism; and an ascent/descent control unit which judges whether or not a bumping process for balancing the transport mechanism by means of the bumping unit is to be carried out on the basis of the detection result of the balance detection unit when the transport mechanism is moved from the retract position to the recording position.

Further, the present control method used for an image recording apparatus comprising an image recording unit having a recording head for performing a recording process by jetting ink to a recording medium; a transport mechanism for mounting and transporting the recording medium; an ascent/descent mechanism comprising an ascent/descent drive unit used for moving, by means of winding or unwinding a cable, the transport mechanism between a recording position to which it is moved when the image recording unit performs the recording process and at least one retract position, wherein the method comprises: detecting whether or not the transport mechanism is balanced when it is moved from the retract position to the recording position; and judging, on the basis of the result of the detection, whether or not a bumping process for balancing the transport mechanism is to be carried out.

DESCRIPTION OF THE PREFERRED EMBODIMENTS

The following is a description, in detail, of the preferred embodiment of the present invention with reference to the accompanying drawings.

The following description exemplifies the case of configuring an image recording apparatus according to the present embodiment as a full line type image recording apparatus employing an inkjet system.

The image recording apparatus comprises plural recording heads provided for the respective colors each with a plurality of nozzles for jetting ink formed therein in a direction (i.e., the primary scan direction) that is orthogonal to a transport direction (i.e., the secondary scan direction) in which a recording medium is transported, in such a manner as to be apart from one another in a secondary scan direction. Such an image recording apparatus (e.g., a color printer) places a recording medium on which a recording process is applied opposite to a plurality of ink nozzles of a recording head and causes the ink nozzles to jet the respective color inks onto the recording medium, thereby recording a character and/or an image.

Note that the image recording apparatus according to the present embodiment is applicable not only to a full line type image recording apparatus employing an inkjet system but also to another apparatus employing another system, provided that it is an image recording apparatus comprising a cable suspension type ascent/descent mechanism.

First, the image recording apparatus according to a first preferred embodiment is described.

Figure 1:
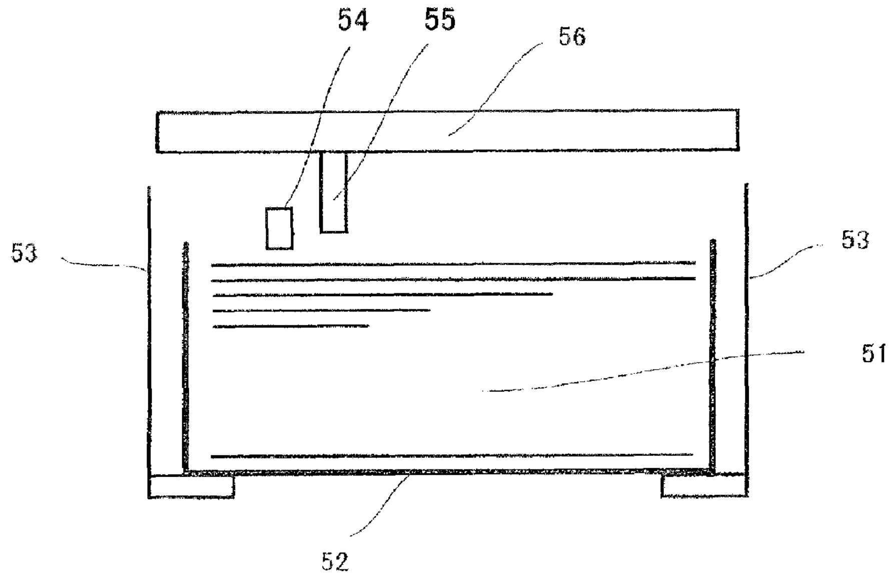
FIG. 1 is a diagram for describing the image forming apparatus disclosed in reference patent document 1.
Figure 2:
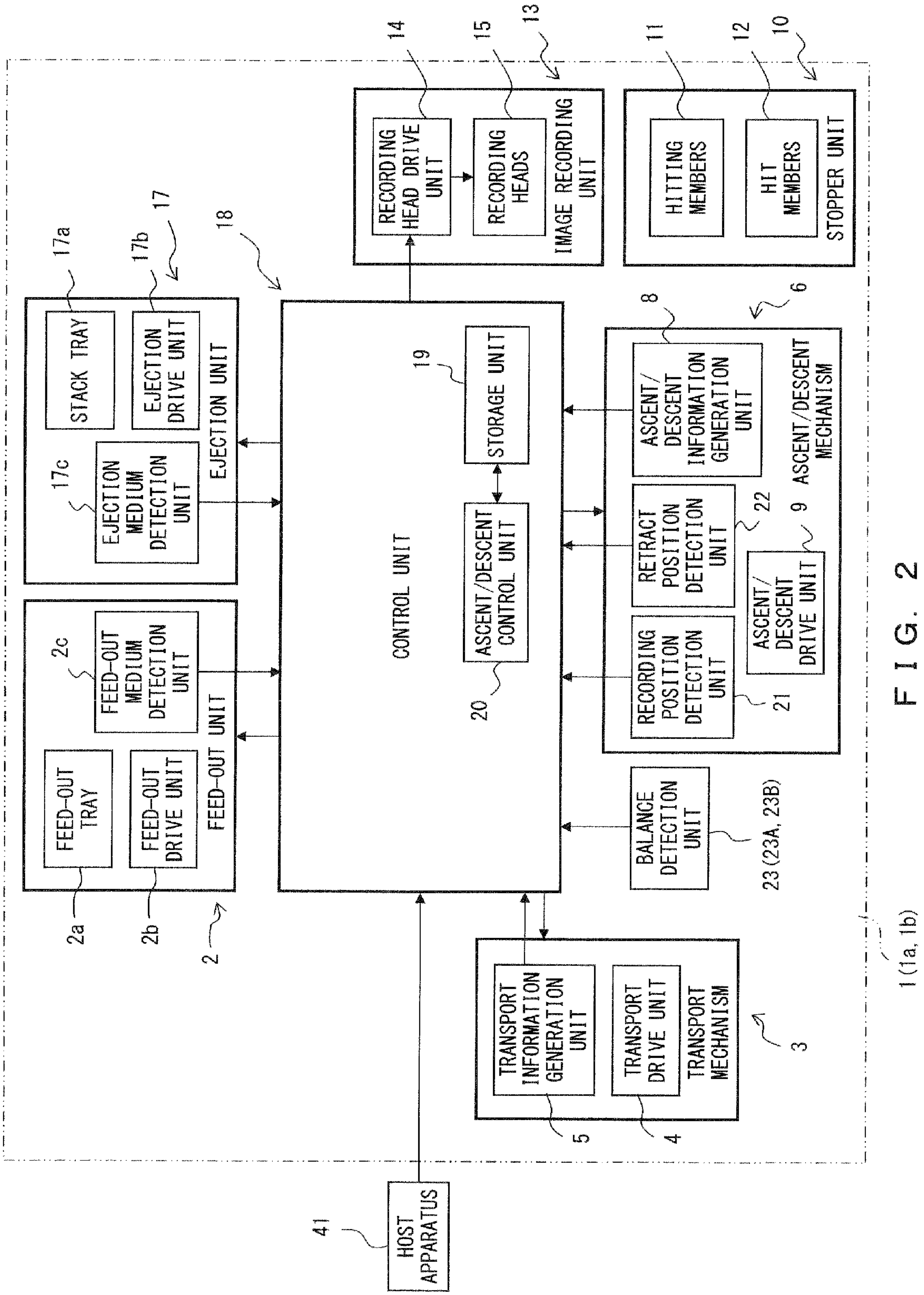
FIG. 2 is a block diagram showing a conceptual configuration comprised by an image recording apparatus according to first and second preferred embodiments.
Figure 3:
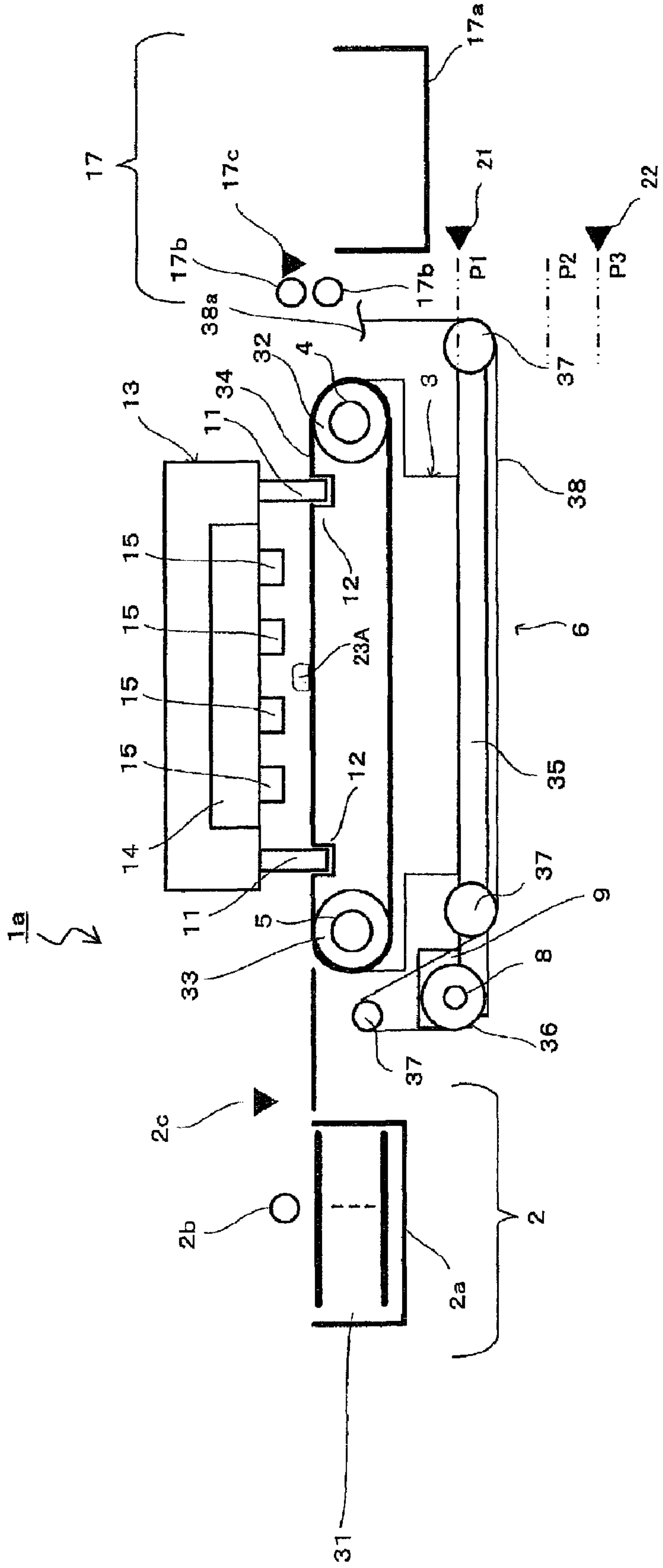
FIG. 3 is a diagram showing an exemplary layout of the individual constituent components of the image recording apparatus according to the first embodiment.

FIG. 2 is a block diagram showing a conceptual configuration comprised by an image recording apparatus according to first and second preferred embodiments. Further, FIG. 3 is a diagram showing a conceptual configuration related to a feed-out unit 2, a transport mechanism 3, an ascent/descent mechanism 6, an image recording unit 13, a balance detection unit 23A, and an ejection unit 17, all of which are parts of the entirety of the image recording apparatus according to the first embodiment.

The following description defines the transport direction of a recording medium as the secondary scan direction, and a direction orthogonal to the transport direction as the primary scan direction.

The image recording apparatus 1 (1*a* or 1*b*) comprises: at least a control unit 18 for controlling the entirety of the apparatus; a feed-out unit 2 for feeding out and transporting a recording medium 31; a transport mechanism 3 for transporting the recording medium handed from the feed-out unit 2; an ascent/descent mechanism 6 for causing the transport mechanism 3 to ascend and descend; an image recording unit 13 for recording an image on the recording medium; a bumping unit 10 for use at a bumping process in which the transport mechanism 3 is bumped against the image recording unit 13; a balance detection unit 23 (23A or 23B) used for detecting the transport mechanism 3; and an ejection unit 17 for ejecting and stacking the image-recorded recording medium or media.

Next the individual constituent components of the above described image recording apparatus 1 are described in detail.

The control unit 18 comprises an arithmetic operation processing apparatus including, for example, a micro processing unit (MPU) managing the control function and arithmetic operation function of the entirety of the image recording apparatus 1, and a storage unit 19 using, for example, non-volatile memory, for storing a control program and record data in order to cause the MPU to perform the processing for controlling the image recording apparatus 1. Further, the storage unit 19 stores a program used for attaining the function of an ascent/descent control unit 20 according to the present embodiment as a part of the control program.

Note that the ascent/descent control unit 20 may be attained by using a hardware scheme, that is, devising, using a logic circuit, a signal processing circuit controlled by the MPU comprised in the control unit 18, in place of attaining the signal processing circuit by means of the above described software scheme.

The feed-out unit 2 comprises a feed-out tray 2*a* for housing the recording media 31, and a feed-out drive unit 2*b* for feeding out a recording medium 31 by one sheet from the feed-out tray 2*a* by abutting on the top recording medium 31 housed therein and handing it over to the transport mechanism 3. The feed-out tray 2*a* comprises a so-called feed-out cassette and other relevant components. Further, the feed-out drive unit 2*b* comprises, for example, a feed-out roller(s).

A feed-out medium detection unit 2*c*, comprising, for example, an optical transmissive sensor, an optical reflective sensor, or a capacitive sensor, and other relevant components, detects, for example, the lead edge of the recording medium 31 along the primary direction thereof.

The transport mechanism 3 is equipped in such a manner that the transport surface thereof faces the ink jetting outlet of a plurality of recording heads 15 as shown in FIG. 3. The inside of the frame of the transport mechanism 3 is equipped with a drive roller 32 and a driven roller 33 in such a manner as to be apart from each other in the secondary scan direction, and is equipped with a transport drive unit 4 used for rotating the drive roller 32. In addition, an endless transport belt 34 is rotationally mounted around the aforementioned rollers. Further, the inside of the frame of the transport mechanism 3 is also equipped with a transport information generation unit 5, a bumped member 12, and at least one suction fan (which is not shown in a drawing herein), all of which are equipped apart from one another in the secondary scan direction.

Note that the transport mechanism 3 locates itself in at least three positions, that is, a recording position P1 that is applied when an image recording process is performed, a retract position 22 for temporarily placing the transport mechanism 3 apart from the recording position when a state in which job information is not received from a host apparatus 41 has continued for a certain period of time, and a retract position P3 for placing the transport mechanism 3 apart from the image recording unit 13 for the maximum distance in order to remove a recording medium 31 following an occurrence of the recording medium 31 being jammed. Note that, in FIG. 3, the respective positions of P1, P2 and P3 show the positions of the bottom surface of the transport mechanism 3 or those of the top surface of the ascent/descent mechanism 6.

The transport information generation unit 5 is provided for detecting the moving state of the transport belt 34 and generating the transport information such as a transport timing and the like, and is constituted by, for example, an encoder and other relevant components.

The suction fan (not shown in a drawing herein) generates a vacuum pressure so as to transport a recording medium 31 by suctioning it onto the transport belt 34.

The ascent/descent mechanism 6, as shown in FIG. 3, comprises: an ascent/descent table 35 used for mounting a transport mechanism 3; a winding roller 36; a motor and a driver therefor (which are not shown in a drawing herein); an ascent/descent drive unit 9 for driving the winding roller 36 on the basis of a control signal from the ascent/descent control unit 20; ascent/descent driven rollers 37 placed at four corners of the ascent/descent table 35 and above the feed-out unit; a cable 38 wrapped around the ascent/descent driven rollers 37; an ascent/descent information generation unit 8 mounted on the shaft of the winding roller 36; a recording position detection unit 21 for detecting the event of the transport mechanism 3 mounted on the ascent/descent table 35 reaching the recording position P1; and a retract position detection unit 22 for detecting the event of the transport mechanism 3 mounted on the ascent/descent table 35 reaching the retract position P3.

The retract position detection unit 22, comprising, for example, an optical transmissive sensor, an optical reflective sensor, or the like, reports the event of the ascent/descent table 35 reaching the retract position P3 to the control unit 18. The recording position detection unit 21, comprising, for example, an optical transmissive sensor, an optical reflective sensor, or the like, reports the event of the ascent/descent table 35 reaching the recording position P1 to the control unit 18. The ascent/descent information generation unit 8, comprising an encoder and the like, reports ascent/descent information generated by the rotation of the winding roller 36 to the control unit 18. The cable 38 is provided for suspending the transport mechanism 3 and ascent/descent table 35, which is positioned below the transport mechanism 3, by way of the ascent/descent driven rollers 37. One end of the cable 38 is connected to the winding roller 36, while the other cable-end 38*a* is connected to the frame (not shown in a drawing herein) of the image recording apparatus, and the cable 38 is constituted by, for example, a wire.

The stopper unit 10, in order to lift the transport mechanism 3 to the recording position when performing a recording process, comprises a plurality of pairs of bumping members 11 and bumped members 12, which are used when the transport mechanism 3 is abutted onto the image recording unit 13. The position at which the bumping members 11 and the bumped members 12 are respectively engaged together is premised as the position at which the transport mechanism 3 reaches the recording position P1. The present specification document defines the operation process for stopping the transport mechanism 3 at the recording position by respectively engaging the bumping members 11 with bumped members 12 as bumping or a bumping process. Further, the present embodiment comprises three pairs of the bumping members 11 and bumped members 12.

The image recording unit 13 is equipped with a plurality of ink-jetting nozzles that are arrayed linearly and in a length exceeding the maximum recording medium width on the basis of the design. The image recording unit 13 comprises a recording head 15 allowing for control of the individual nozzles respectively jetting inks in accordance with a drive signal from a recording head drive unit 14. Further, the image recording unit 13 comprises the recording head drive unit 14 for outputting, to the recording head 15, a drive signal on the basis of the recording data received from a host apparatus 41. Furthermore, the image recording unit 13 comprises bumping members 11 that are to be engaged (i.e., contacted) with the bumped member 12 of the transport mechanism 3 in order to maintain the distance between the image recording unit 13 and transport mechanism 3 when a recording process is carried out.

The ejection unit 17 comprises: an ejection drive unit 17*b* for ejecting a recording medium 31 to which an image recording has been applied by the image recording unit 13; an ejection medium detection unit 17*c* for detecting the edge of the ejected recording medium 31; and a stack tray 17*a* for stacking the ejected recording medium 31.

The stack tray 17*a* is constituted by a so-called output tray and other relevant components. The ejection drive unit 17*b* is constituted by, for example, an ejection roller. The ejection medium detection unit 17*c*, being constituted by, for example, an optical transmissive sensor, an optical reflective sensor, or a capacitive sensor and other relevant components, detects, for example, the trailing edge of a recording medium 31 along the primary scan direction thereof. The ejection medium detection unit 17*c* may of course be configured to detect the leading edge of the recording medium 31 if appropriate.

The control unit 18 controls the feed-out unit 2, transport mechanism 3, ascent/descent mechanism 6, image recording unit 13, ejection unit 17, storage unit 19, and ascent/descent control unit 20, respectively, using a control signal or signals.

The storage unit 19, being constituted by nonvolatile memory and the like, stores information required for a bumping process, e.g., a bumping process time for balancing the transport mechanism 3 (as described later) or a value obtained by converting the amount of movement required to return to the retract position P2 into the number of encoder pulses from the ascent/descent information generation unit 8. Note that the bumping process time is a length of time calculated on the basis of both the amount of ascent of the transport mechanism 3 for a bumping process and the ascending speed of the transport mechanism 3.

The balance detection unit 23A, being constituted by, for example, an optical sensor (which is described later) and the like, reports the information of the balance of the transport mechanism 3 to the control unit 18.

The ascent/descent control unit 20 controls the ascent/descent mechanism 6 on the basis of the detection result of the balance detection unit 23A so that the transport mechanism 3 stops at the recording position P1 while maintaining the balance of the transport mechanism 3.

The host apparatus 41 is connected as a device that is external to the image recording apparatus 1 according to the present embodiment by way of, for example, a local area network (LAN) or the like. The host apparatus 41 is equivalent to a user's computer causing the image recording apparatus 1 according to the present embodiment to carry out a recording process, and reports job information as the information related to the recording process to the image recording apparatus 1. The job information includes the recording data to be used when a recording process is performed on a recording medium 31 and the designating information of the number of recording media 31 to be used when the recording process is carried out.

The control unit 18, receiving the report of job information sent from the host apparatus 41, instructs the ascent/descent control unit 20 to lift the ascent/descent mechanism 6 from the retract position P3 at which a jammed sheet is removed or the like operation is carried out, or from the retract position P2, to the bumping position (i.e., the recording position P1) at which the bumping members 11 are engaged with the bumped members 12. The ascent/descent control unit 20 controls the ascent/descent drive unit 9 of the ascent/descent mechanism 6 so as to lift the ascent/descent mechanism 6 by winding the cable 38 by means of the winding roller 36.

The ascent/descent mechanism 6 and the transport mechanism 3 which is mounted thereon ascend to the position at which the bumped members 12 placed on the transport mechanism 3 come into contact with the bumping members 11 of the image recording unit 13 (i.e., the recording position P1). Note that a method for stopping the transport mechanism 3 mounted on the ascent/descent mechanism 6 at the recording position with the transport mechanism 3 maintaining a balanced state is described later.

Further, the control unit 18 causes the drive roller 32 of the transport mechanism 3 to rotate, thereby causing it to start to drive the transport belt 34. Furthermore, the control unit 18 drives a suction fan (not shown in a drawing herein) so as to suction the recording medium 31 onto the transport belt 34. The control unit 18 drives the feed-out drive unit 2*b* of the feed-out unit 2, thereby feeding out a recording medium 31 sheet by sheet from the feed-out tray 2*a* and handing it over to the transport mechanism 3.

When the leading edge of the recording medium 31 reaches the feed-out medium detection unit 2*c* positioned downstream of the feed-out unit 2, the feed-out medium detection unit 2*c* transmits a detection signal of the recording medium 31 to the control unit 18, which then generates a recording process timing on the basis of the signal so as to control the recording process.

Incidentally, an encoder pulse signal generated by the transport information generation unit 5 is also used as a synchronous signal when an image recording is performed by the recording head 15. The control unit 18 readily stores the timing to start jetting ink from the nozzle as the number of pulses of the encoder pulse signal. Then, when the number of pulses matches the count value of the encoder pulse generated by the transport information generation unit 5, the control unit 18 causes the nozzles to jet inks to the recording medium suctioned onto the transport belt 34, thereby carrying out the recording process. Then, the post-recording process recording medium 31 is handed over to the ejection unit 17 equipped downstream of the transport mechanism 3.

In the ejection unit 17 the recording medium 31 is sandwiched by the ejection drive unit 17*b* and transported downstream. The trail edge of the recording medium 31 is detected by the ejection medium detection unit 17*c* and then the recording medium 31 is stacked in the stack tray 17*a*.

Incidentally, if there is no request for carrying out a recording process from the host apparatus 41 for a certain period of time after ending the recording process performed on the recording medium 31, the control unit 18 instructs the ascent/descent control unit 20 to drive the ascent/descent drive unit 9 of the ascent/descent mechanism 6 in order to lower the transport mechanism 3 to the retract position P2. The ascent/descent control unit 20 unwinds the cable 38 wound on the winding roller 36, thereby lowering the transport mechanism 3 until the number of encoder pulses obtained from the ascent/descent information generation unit 8 matches a value produced by converting the retract position P2 into the number of encoder pulses.

When the transport mechanism 3 is stopped at the retract position P2, the control unit 18 moves a maintenance unit (not shown in a drawing herein) to a position opposite to the recording head 15. A maintenance operation is carried out on an as required basis so as to prevent an ink clogging in the recording head 15.

Next is a description of a control for the ascent/descent mechanism of an image recording apparatus 1*a* according to the first embodiment.

Figure 4B:
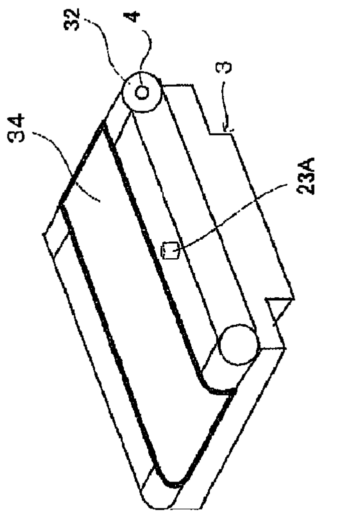
FIGS. 4A and 4B are diagrams for describing together the placement of a balance detection unit according to the first embodiment.
Figure 4C:
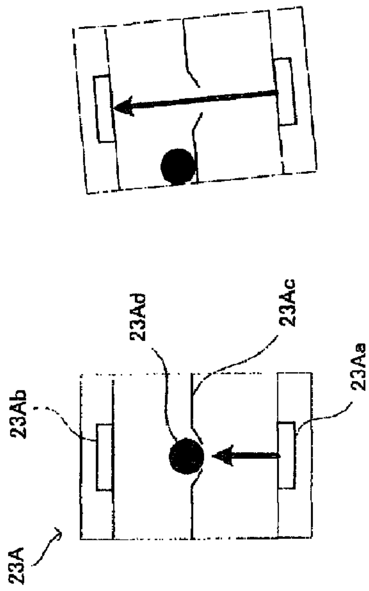
FIG. 4C is a diagram showing a conceptual configuration of the balance detection unit.
Figure 4A:
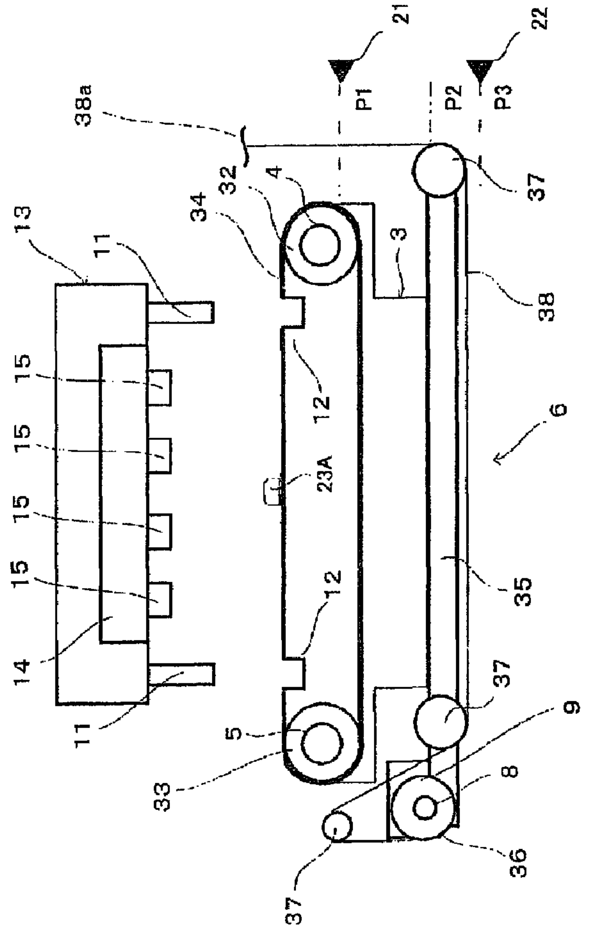

FIGS. 4A and 4B are diagrams for describing together the placement of the balance detection unit 23A according to the first embodiment; FIG. 4C is a diagram showing a conceptual configuration of the balance detection unit 23A.

Note that FIG. 4A shows the state of the transport mechanism 3 stopping at the retract position P2.

As shown in FIGS. 4A and 4B, the balance detection unit 23A is equipped on the transport mechanism 3 in such a manner as to not come into contact with the opposite image recording unit 13 and, further, to be apart from the transport belt 34, even when the transport mechanism 3 is stopped at the recording position P1.

The balance detection unit 23A comprises at least a light emission unit 23Aa, a light reception unit 23Ab, a positioning plate 23Ac, and a light shield member 23Ad.

The light emission unit 23Aa and light reception unit 23Ab are placed opposite to each other, and the between the two is equipped the light shield member 23Ad for shielding the light emitted from the light emission unit 23Aa and the positioning plate 23Ac used for determining the position of the light shield member 23Ad.

The configuration is also such that a concave part is provided on the positioning plate 23Ac and in the light path between the light emission unit 23Aa and light reception unit 23Ab so that the light shield member 23Ad falls into the concave part of the positioning plate 23Ac when the transport mechanism 3 is balanced.

When the transport mechanism 3 is balanced, the light shield member 23Ad falls into the concave part of the positioning plate 23Ac and thereby the light emitted from the light emission unit 23Aa is shielded by the light shield member 23Ad. With this, an event wherein the transport mechanism 3 is balanced (i.e., the detection result of the balance detection unit 23A is "ON") is reported to the control unit 18. In contrast, if the transport mechanism 3 is not balanced, the light shield member 23Ad falls out of the concave part of the positioning plate 23Ac and thereby the light emitted from the light emission unit 23Aa reaches the light reception unit 23Ab. With this, an event wherein the transport mechanism 3 is not balanced (i.e., the detection result of the balance detection unit 23A is "OFF") is reported to the control unit 18.

FIG. 5 (i.e., 5A, 5B and 5C) is an illustrative diagram showing the transport mechanism 3 according to the first embodiment, when the transport mechanism 3 is ascending, and FIG. 6 (i.e., 6A and 6B) is a timing chart of individual signals when the transport mechanism according to the first embodiment is ascending.

Figures 5A, 5B, 5C:
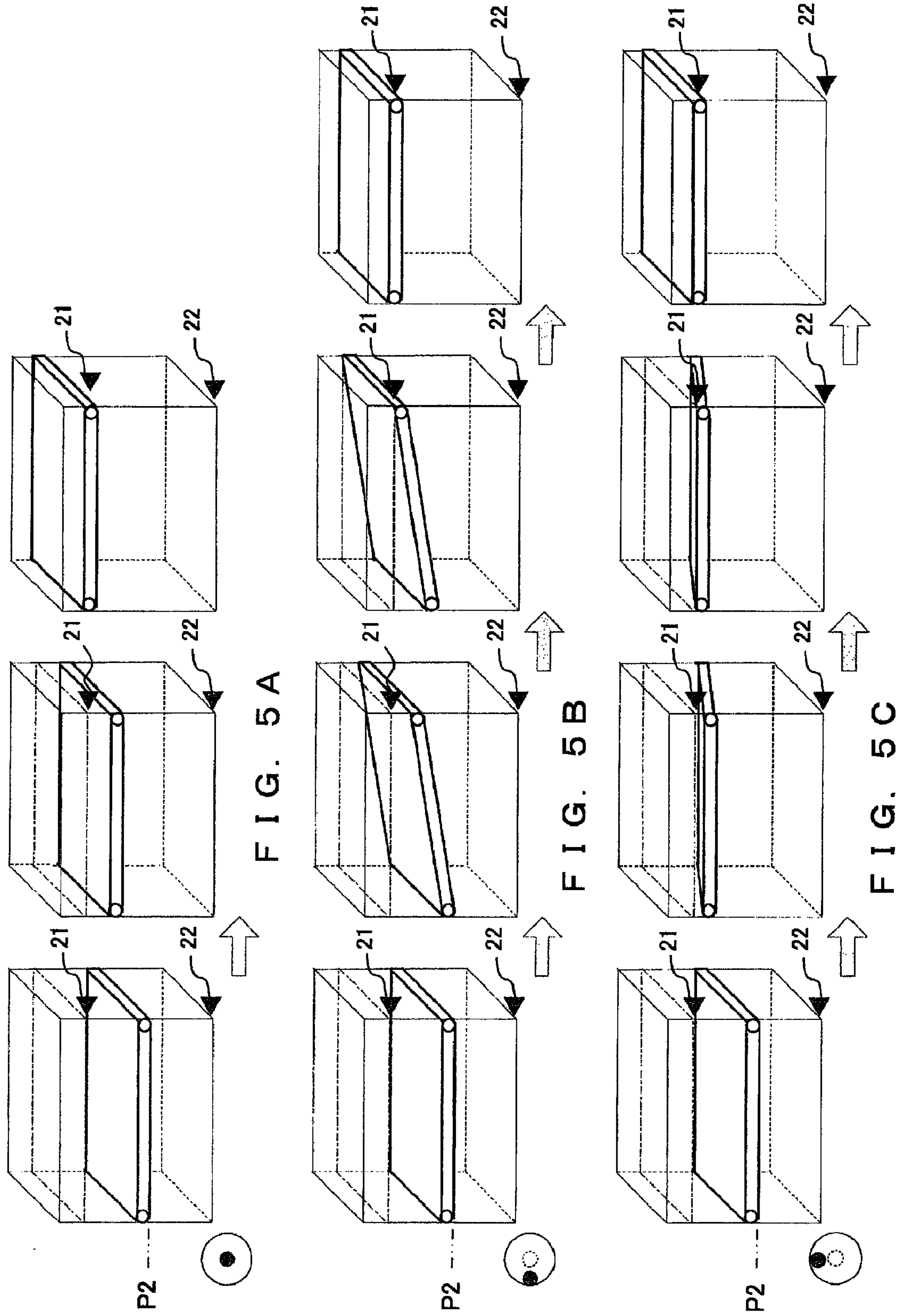
FIGS. 5A, 5B and 5C are illustrative diagrams together showing a transport mechanism 3 according to the first embodiment, when the transport mechanism 3 is ascending.
Figure 6A:
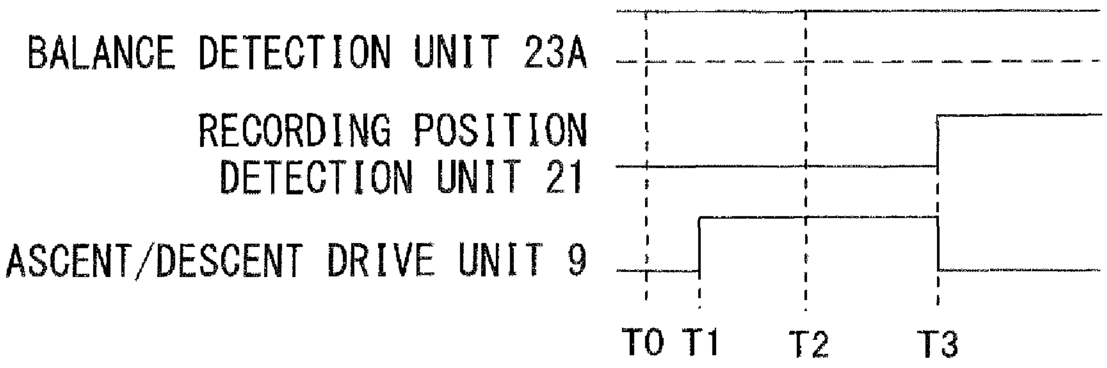
FIGS. 6A and 6B are timing charts of individual signals when the transport mechanism according to the first embodiment is ascending.

FIG. 5A is a diagram illustrating how the transport mechanism 3 ascends from the stopped state at the retract position P2 to the recording position P1 while maintaining a balanced state, in which event the ascent/descent control unit 20 controls the ascent/descent mechanism 6 at the timings represented by the timing chart shown in FIG. 6A.

Referring to FIG. 6A, the control unit 18, receiving job information from the host apparatus 41 at the timing T0, starts to obtain a detection result from the balance detection unit 23A and also instructs the ascent/descent control unit 20 to lift the transport mechanism 3. Having received the instruction, the ascent/descent control unit 20 starts to drive the ascent/descent drive unit 9 at the timing T1. In the case of FIG. 6A, the detection result of the balance detection unit 23A has been continuously "ON", and accordingly the ascent/descent control unit 20 confirms that the transport mechanism 3 is balanced.

Note that the timing for finishing obtaining the detection result from the balance detection unit 23A is pre-stored in the storage unit 19 as a value produced by converting into the number of pulses the value obtained from the ascent/descent information generation unit 8, so that the timing at which the aforementioned number of pulses matches the number of cumulative pulses obtained from the ascent/descent information generation unit 8 constitutes the timing T2.

In the case of FIG. 5A, the transport mechanism 3 ascends in the state of being balanced, and accordingly the ascent/descent control unit 20 stops the ascent operation of the transport mechanism 3 by stopping the ascent/descent drive unit 9 immediately upon detecting that the event of the transport mechanism 3 reaching the recording position P1 at the timing T3, by way of receiving the report from the recording position detection unit 21.

FIG. 5B is a diagram illustrating how the transport mechanism 3 ascends from the stopped state at the retract position P2 to the recording position P1, exemplifying the case of the transport mechanism 3 being inclined toward the direction of the feed-out unit while the transport mechanism 3 reaches the recording position P1 in contrast, FIG. 5C exemplifies the case of the transport mechanism 3 being inclined toward the far side of the primary scan direction of the image recording apparatus while the transport mechanism 3 reaches the recording position P1.

Figure 6B:
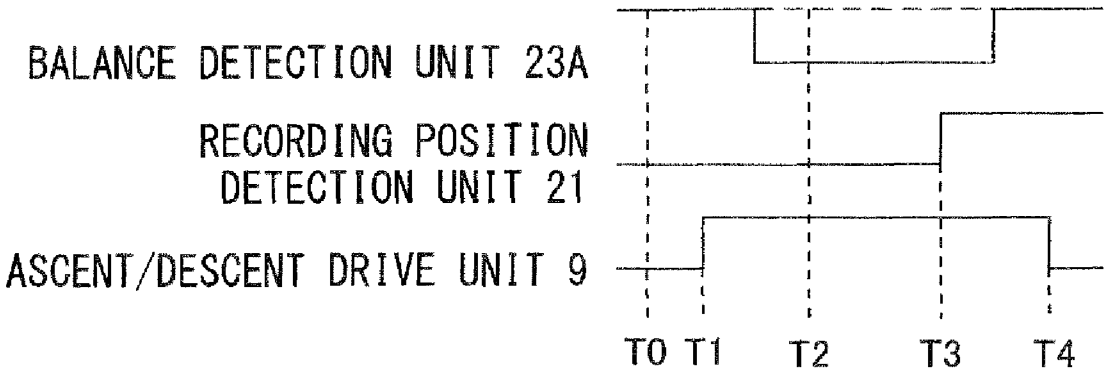

FIG. 6B is a timing chart for the ascent/descent control unit 20 controlling the ascent/descent mechanism 6 in the state of the transport mechanism 3 being inclined as shown in FIG. 5B or 5C.

The control unit 18, receiving job information from the host apparatus 41 at the timing T0, starts to obtain the detection result from the balance detection unit 23A and also instructs the ascent/descent control unit 20 to lift the transport mechanism 3. The ascent/descent control unit 20 starts to drive the ascent/descent drive unit 9 at the timing T1. Then the ascent/descent control unit 20 confirms that the transport mechanism 3 is not balanced because the detection result of the balance detection unit 23A has been changed to "OFF" until the timing reaches T2.

Since the transport mechanism 3 is not balanced, the ascent/descent control unit 20 continues to carry out the bumping process by continuously driving the ascent/descent drive unit 9, thereby causing the transport mechanism 3 to shift to a balanced state. Then the ascent/descent control unit 20 stops driving the ascent/descent drive unit 9 at the timing T4 when the elapsed time from the timing T3 matches the bumping process time read from the storage unit 19.

As described above, the image recording apparatus 1*a* according to the first embodiment balances the transport mechanism 3 by carrying out a bumping process when the ascent/descent mechanism 6 lifts the transport mechanism 3 unbalanced, and the image recording apparatus 1*a* carries out no bumping process when the ascent/descent mechanism 6 lifts it unbalanced. This configuration carries out no extraneous bumping process, thereby making it possible to lighten the load levied on the ascent/descent drive unit 9 and cable 38 of the ascent/descent mechanism 6.

Next is a description of an ascent/descent mechanism control method and a program implementing the method, which is carried out by the image recording apparatus according to the first embodiment.

Figure 7:
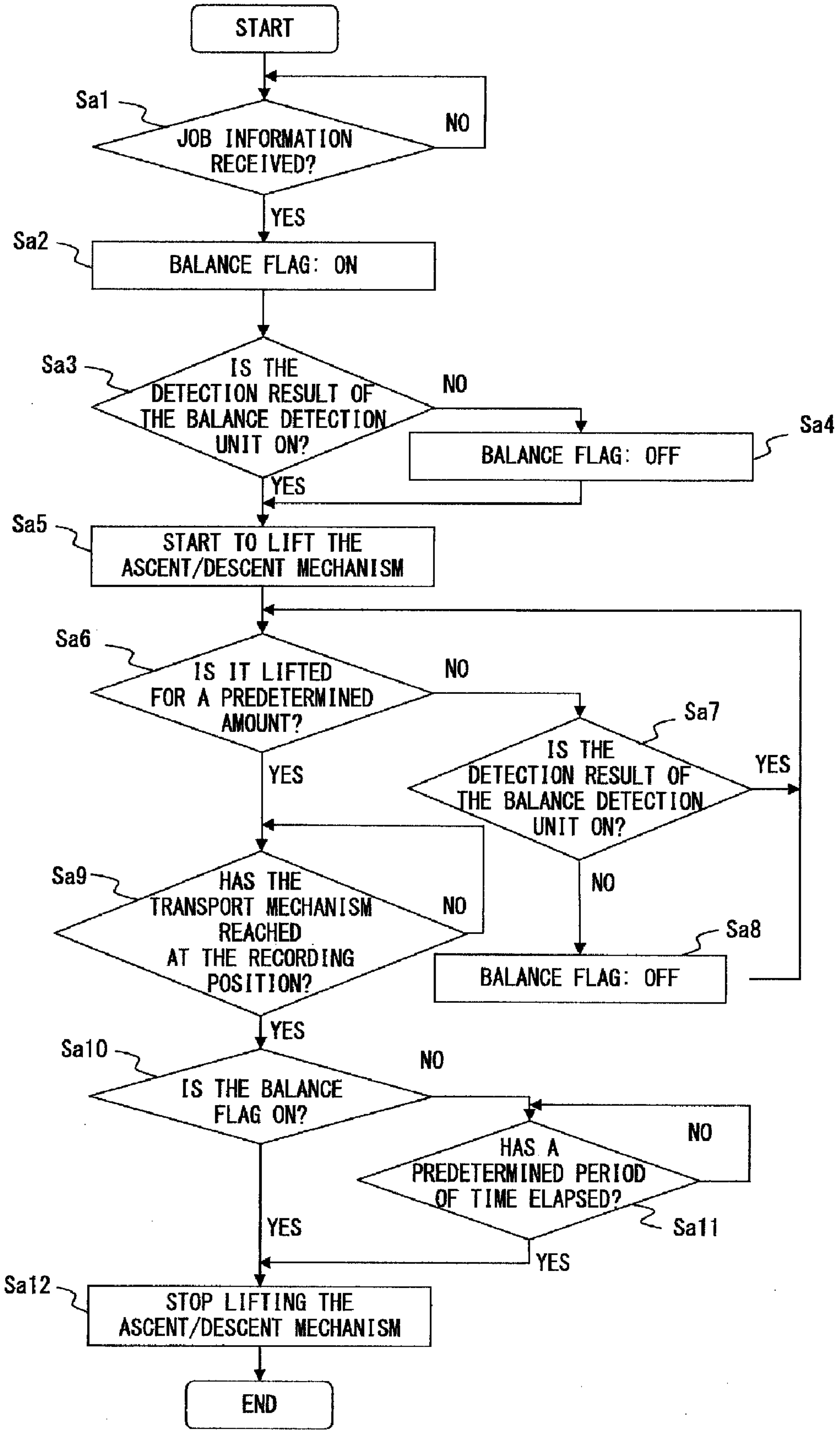
FIG. 7 is a flow chart showing an operation process attained by an ascent/descent mechanism control method and a program performed by the image recording apparatus according to the first embodiment.

FIG. 7 is a flow chart showing an operation process attained by an ascent/descent mechanism control method performed by the image recording apparatus according to the first embodiment.

The operation process shown in FIG. 7 is attained by the arithmetic operation processing apparatus of the control unit 18 executing a control program equivalent to the ascent/descent control unit 20.

In step Sa1, the control unit 18 judges whether or not job information has been received from the host apparatus 41 and, if job information is not received ("no" for step Sa1), makes the process stand by in step Sa1. If the judgment in Sa1 is that the job information has been received ("yes" for step Sa1), the control unit 18 shifts the process to step Sa2.

In step Sa2, the control unit 18 sets a balance flag at "ON" as the initial value, to indicate the balancing of the transport mechanism 3

Then in step Sa3, the control unit 18 judges whether or not the detection result of the balance detection unit 23A is ON and, if the judgment result is that it is not ON ("no" for step Sa3), sets the balance flag to OFF in step Sa4. In contrast, if the judgment result in step Sa3 is that the detection result of the balance detection unit 23A is ON ("yes" for step Sa3), it shifts the process to step Sa5.

Then, in step Sa5, the control unit 18 drives the ascent/descent drive unit 9 to start lifting the ascent/descent mechanism 6.

Then, in step Sa6, the control unit 18 judges whether or not the ascent/descent mechanism 6 has lifted the transport mechanism 3 a predetermined amount and, if the judgment is that it is not lifted it the predetermined amount ("no" for step Sa6), further judges whether the detection result of the balance detection unit 23A is ON, in step Sa7. If the judgment is that the detection result of the balance detection unit 23A is not ON ("no" for step Sa7), the control unit 18 sets the balance flag to OFF in step Sa8 and returns the process to step Sa6. In contrast, if the judgment in step Sa7 is that the detection result of the balance detection unit 23A is ON ("yes" for step Sa7), the control unit 18 returns the process to step Sa6. Thereafter, the processes of steps Sa6 through Sa8 are repeated until the control unit 18 judges that the transport mechanism 3 has been lifted the predetermine amount.

Then in step Sa6, if the control unit 18 judges that the transport mechanism 3 has been lifted the predetermined amount ("yes" for step Sa6), then in step Sa9, the control unit 18 monitors the output of the recording position detection unit 21 and waits for the transport mechanism 3 to reach the recording position P1 ("no" for step Sa9).

In step Sa9, if the control unit 18 judges that the transport mechanism 3 has reached the recording position P1 ("yes" for step Sa9), then, in step Sa10, the control unit 18 examines the setting of the balance flag. If the balance flag is ON ("yes" for step Sa10)), the control unit 18 shifts the process to step Sa12 immediately. In contrast, if the balance flag is riot ON ("no" for step Sa10) in step Sa10, the control unit 18 waits for a predetermined period of time ("no" for step Sa11) and then shifts the process to step Sa12 when the predetermined period elapses ("yes" for step Sa11).

Then in step Sa12, the control unit 18 stops the ascent/descent mechanism 6 and then ends the present process.

As described above, the control unit 18 judges whether or not the transport mechanism 3 is balanced while it is ascending to the recording position P1. Then the control unit 18 carries out a bumping process when the transport mechanism 3 reaches the recording position P1 only if it is not balanced. This control makes it possible to perform a control for an ascent/descent mechanism in such a manner as to not levy an excessive load on the ascent/descent motor, ascent/descent wire, or bumping members.

Incidentally, an alternative configuration may be such that, if the detection result of the balance detection unit 23A is not ON after completing the bumping process, a display device (not shown in a drawing herein) comprised by the image recording apparatus 1*a* displays an event wherein the image recording process cannot be continued and the apparatus itself is emergency-stopped.

Next is a description of an image recording apparatus according to a second preferred embodiment.

Figure 8:
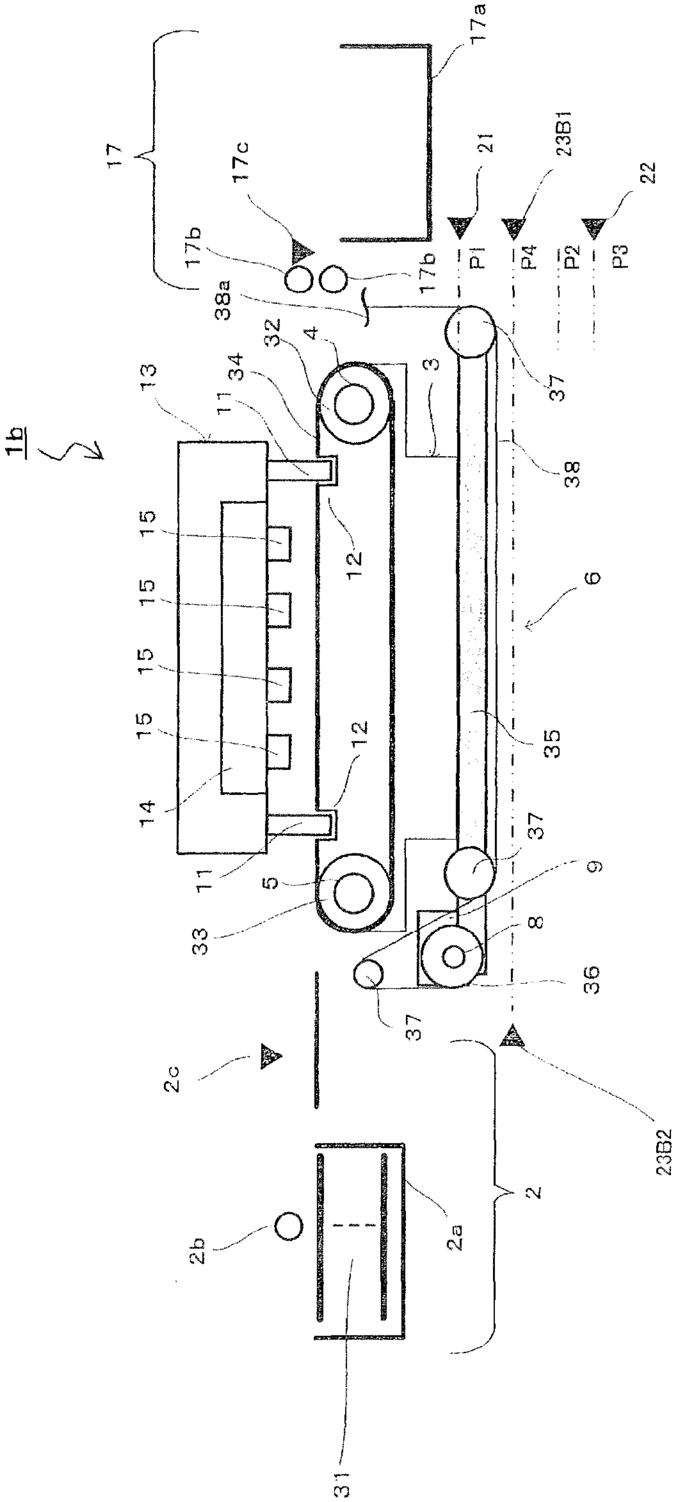
FIG. 8 is a diagram showing an exemplary layout of the individual constituent components of the image recording apparatus according to a second preferred embodiment.

FIG. 8 is a diagram showing an exemplary layout of the individual constituent components of the image recording apparatus 1*b* according to the second embodiment. The following only shows the parts that are different from the first embodiment in the description.

The image recording apparatus 1*b* comprises balance detection units 23B1 and 23B2 for detecting a degree of balance of the transport mechanism 3 upstream and downstream of the ascent/descent mechanism 6, respectively, in the transport direction, in place of comprising the balance detection unit 23A. Further, a balance degree detection position P4 is newly added as a position of the transport mechanism 3.

Here, the balance degree detection position P4 is positioned between the recording position P1 and retract position P2.

The balance detection units 23B1 and 23B2, comprising, for example, an optical transmissive sensor and other relevant components, report the detection information of the transport mechanism 3 to the control unit 18.

Figure 9B:
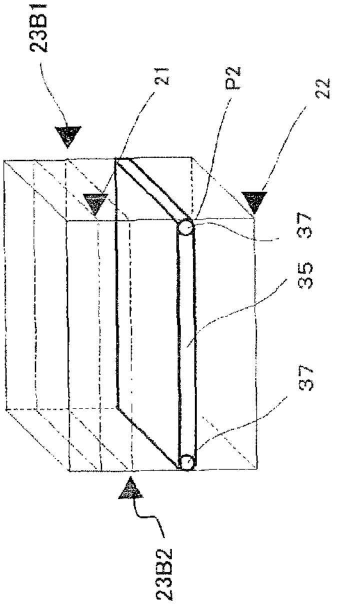
FIGS. 9A and 9B are diagrams for describing together the placement of a balance detection unit according to the second embodiment.
Figure 9C:
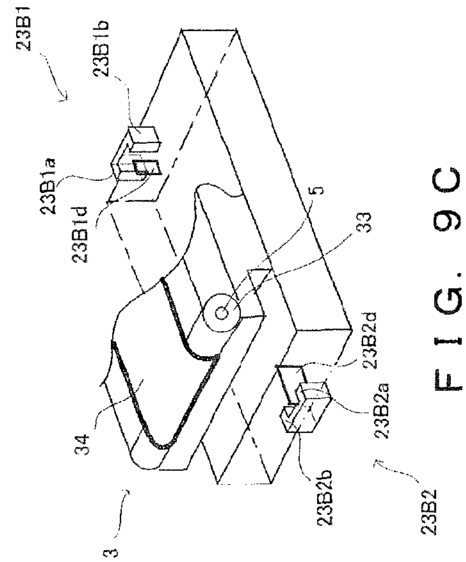
FIG. 9C is a diagram showing a conceptual configuration of the balance detection unit.
Figure 9A:
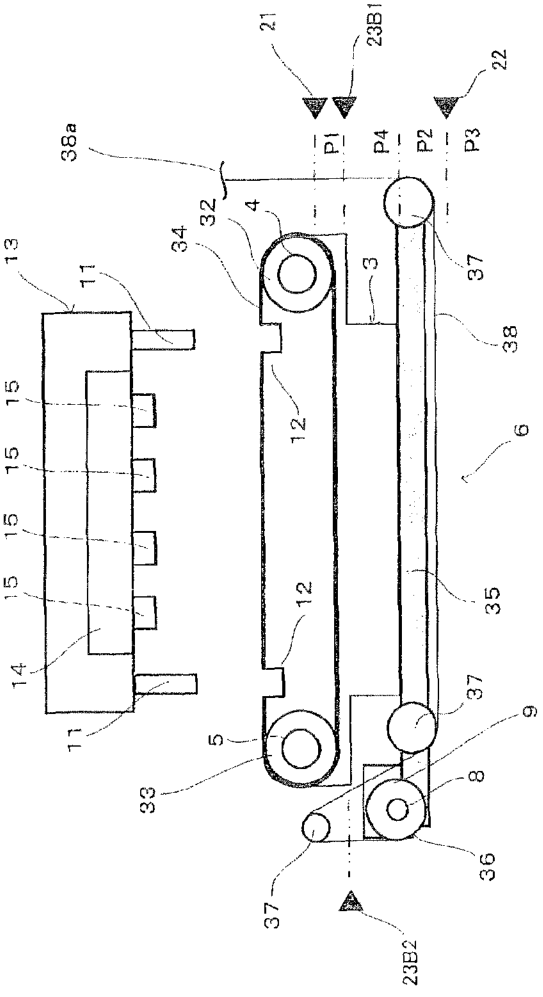

FIGS. 9A and 9B are diagrams for describing the placement of the balance detection units 23B1 and 23B2 according to the second embodiment. FIG. 9C is a diagram showing a conceptual configuration of the balance detection units 23B1 and 23B2. Note that FIG. 9A shows the state of the transport mechanism 3 stopped at the retract position P2.

As shown in FIG. 9B, the balance detection units 23B1 and 23B2 are equipped at the balance degree detection position P4, with the balance detection unit 23B1 equipped at a position along the primary scan direction relative to the recording position detection unit 21. Meanwhile, the balance detection unit 23B2 is equipped at a position along the diagonal direction relative to the balance detection unit 23B1.

The balance detection unit 23B1 comprises at least a light emission unit 23B1*a*, a light reception unit 23B1*b*, and a light shield member 23B1*d* equipped on the ascent/descent table 35. Note that the balance detection unit 23B2 is configured to be the same as the balance detection unit 23B1, and therefore the following description of the configuration and operation is provided by exemplifying the balance detection unit 23B1.

The light emission unit 23B1*a* and light reception unit 23B1*b* are equipped opposite to each other, and between them the light shield member 23B1*d* used for shielding the light emitted from the light emission unit 23B1*a* is equipped. Note that the configuration is such that the light shield member 23B1*d* will be positioned in the light path between the light emission unit 23B1*a* and light reception unit 23B1*b* in accordance with the position of the ascent/descent table 35.

When the transport mechanism 3 is positioned at the balance degree detection position P4, the light emitted from the light emission unit 23B1*a* is shielded by the light shield member 23B1*d*, and thereby the event of the transport mechanism 3 being at the balance degree detection position P4 (that is, "ON" as the detection result of the balance detection unit 23B1) is reported to the control unit 18.

In contrast, if the transport mechanism 3 is not positioned at the balance degree detection position P4, the light shield member 23B1*d* is shifted from the light path and thereby the light emitted from the light emission unit 23B1*a* reaches the light reception unit 23B1*b*. With this, the event of the transport mechanism 3 not being at the balance degree detection position P4 (that is, "OFF" as the detection result of the balance detection unit 23B1) is reported to the control unit 18.

Note that the configuration shown in FIG. 9B exemplifies the case of comprising two balance detection units, i.e., the balance detection units 23B1 and 23B2; an alternative configuration may comprise three or more balance detection units.

FIG. 10 are illustrative diagrams together showing a transport mechanism 3, when it is ascending, according to the second embodiment, and FIG. 11 are timing charts of individual signals when the transport mechanism according to the second embodiment ascends.

Figure 10A:
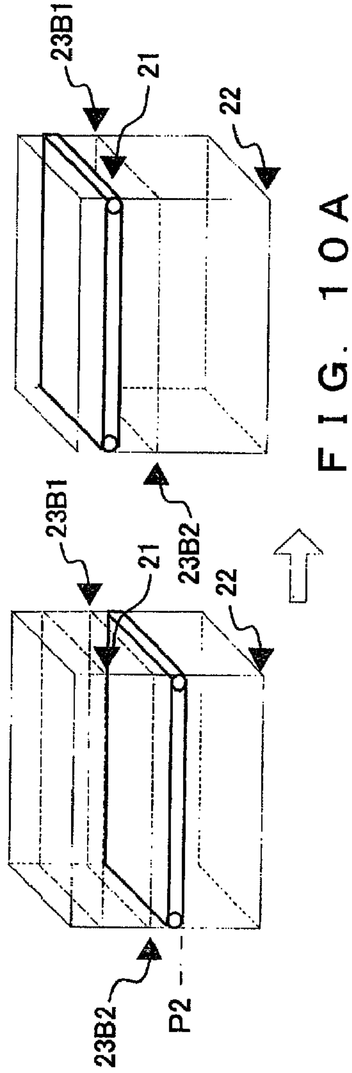
FIGS. 10A, 10B and 10C are illustrative diagrams together showing a transport mechanism 3, when it is ascending, according to the second embodiment.
Figure 11A:
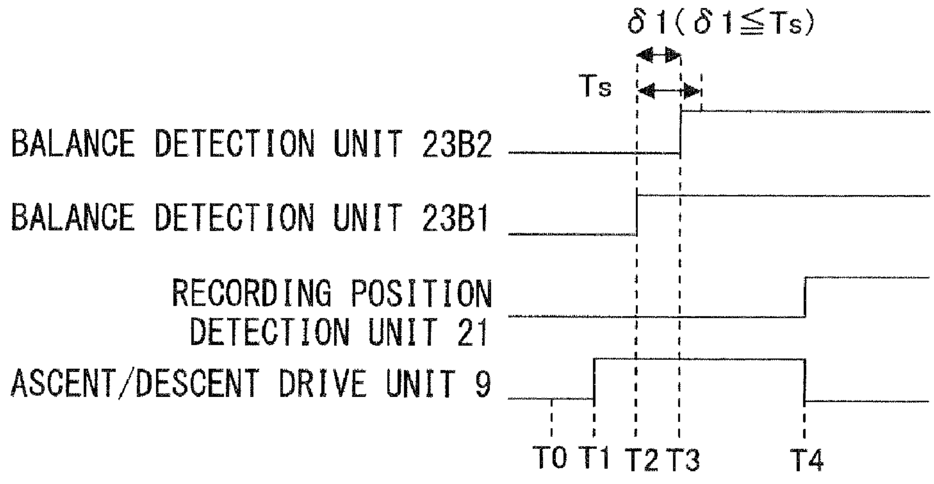
FIGS. 11A, 11B and 11C are timing charts of individual signals when the transport mechanism according to the second embodiment ascends.

FIG. 10A is an illustrative diagram showing how the transport mechanism 3 is ascending in balance, in which event the ascent/descent control unit 20 controls the ascent/descent mechanism 6 at the timing shown in the timing chart of FIG. 11A.

Referring to FIG. 11A, the control unit 18, receiving job information from the host apparatus 41 at the timing T0, starts to receive the detection results from the balance detection units 23B1 and 23B2 and also instructs the ascent/descent control unit 20 to lift the transport mechanism 3. Having received the instruction, the ascent/descent control unit 20 starts to drive the ascent/descent drive unit 9 at the timing T1. Further, the ascent/descent control unit 20 stores the timing T2 at which the detection result of the balance detection unit 23B1 has turned to ON in the storage unit 19 and continues to drive the ascent/descent drive unit 9.

Detecting the event wherein the detection result of the balance detection unit 23B2 has turned to ON at the timing T3, the ascent/descent control unit 20 calculates the amount of ascent δ1 of the ascent/descent mechanism 6 in the period between the timings T2 and T3 as a value converted into the number of pulses of the ascent/descent information generation unit 8. Then the ascent/descent control unit 20 uses a threshold value Ts pre-stored in the storage unit 19 to judge whether or not the transport mechanism 3 is balanced. That is, the ascent/descent control unit 20 compares the threshold value Ts with the value 61 that has been converted into the number of pulses to be generated by the ascent/descent information generation unit 8, and validates that the transport mechanism 3 is balanced because the comparison result is $\delta 1 \leqq Ts$.

Since the transport mechanism 3 is balanced, the ascent/descent control unit 20 stops the lifting operation of the transport mechanism 3 by stopping the ascent/descent drive unit 9 immediately upon detecting the event of the transport mechanism 3 reaching the recording position P1 at the timing T4 on the basis of the notification from the recording position detection unit 21.

Next is a description of the case of the transport mechanism 3 ascending unbalanced.

Figure 10B:
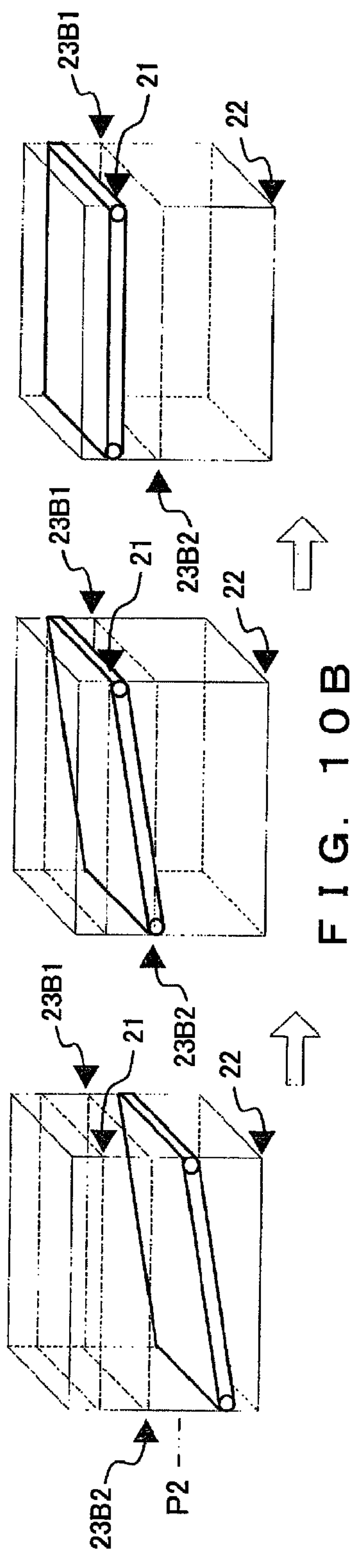
Figure 11B:
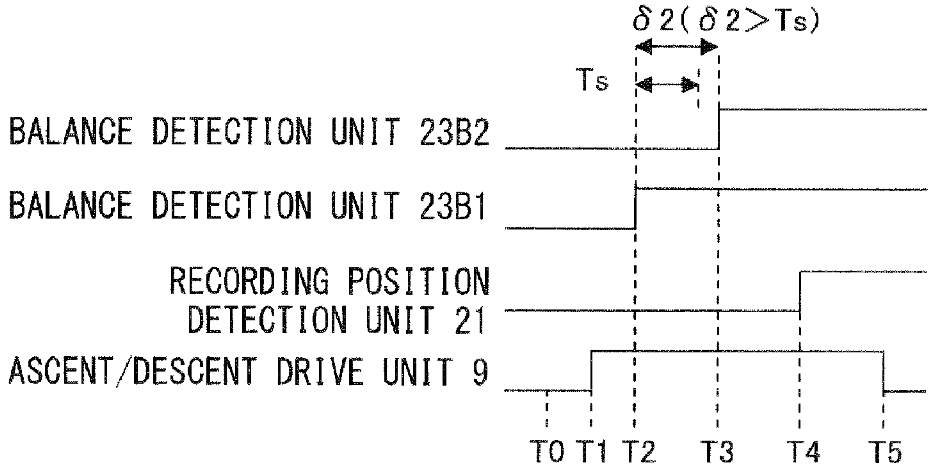

FIG. 10B is an illustrative diagram showing the case of the transport mechanism 3 ascending while it is inclined toward the feed-out unit, and FIG. 11B is a diagram showing the timing chart for the ascent/descent control unit 20 controlling the ascent descent mechanism 6 in the state shown in FIG. 10B.

Referring to FIG. 11B, the control unit 18, receiving job information from the host apparatus 41 at the timing T0, starts to obtain the detection results of the balance detection units 23B1 and 23B2 and also instructs the ascent/descent control unit 20 to lift the transport mechanism 3. Having received the instruction, the ascent/descent control unit 20 starts to drive the ascent/descent drive unit 9 at the timing T1. Then, when the detection result of the balance detection unit 23B1 is turned to ON, the ascent/descent control unit 20 stores the timing T2 in the storage unit 19 and continues to drive the ascent/descent drive unit 9.

Upon detecting that the detection result of the balance detection unit 23B2 is turned to ON at the timing T3, the ascent/descent control unit 20 calculates the amount of ascent δ2 of the ascent/descent mechanism 6 in the period between the timings T2 and T3 as a value converted into the number of pulses of the ascent/descent information generation unit 8. Then the ascent/descent control unit 20 compares the aforementioned threshold value Ts with the ascent amount 62 and validates that the transport mechanism 3 is not balanced because the judgment result is δ2>Ts.

Further, the ascent/descent control unit 20 carries out a bumping process by continuing to drive the ascent/descent drive unit 9, thereby shifting the transport mechanism 3 to a balanced state even when the event of the transport mechanism 3 reaching the recording position P1 at the timing T4 is detected by receiving the report from the recording position detection unit 21 because the transport mechanism 3 is not balanced. When the elapsed time from the timing T4 matches the bumping process time, read from the storage unit 19, at the timing T5, the ascent/descent control unit 20 stops driving the ascent/descent drive unit 9 at the present timing T5.

Figure 10C:
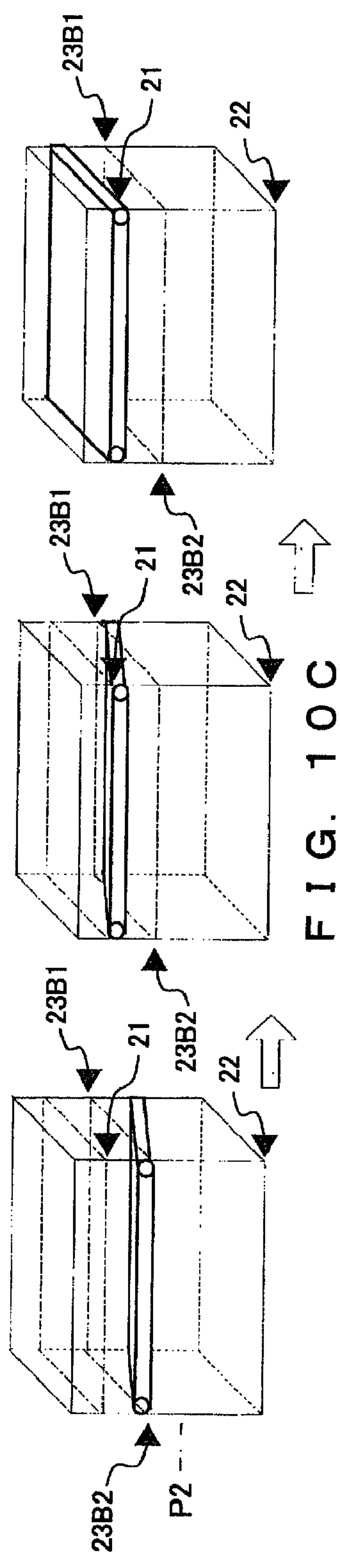
Figure 11C:
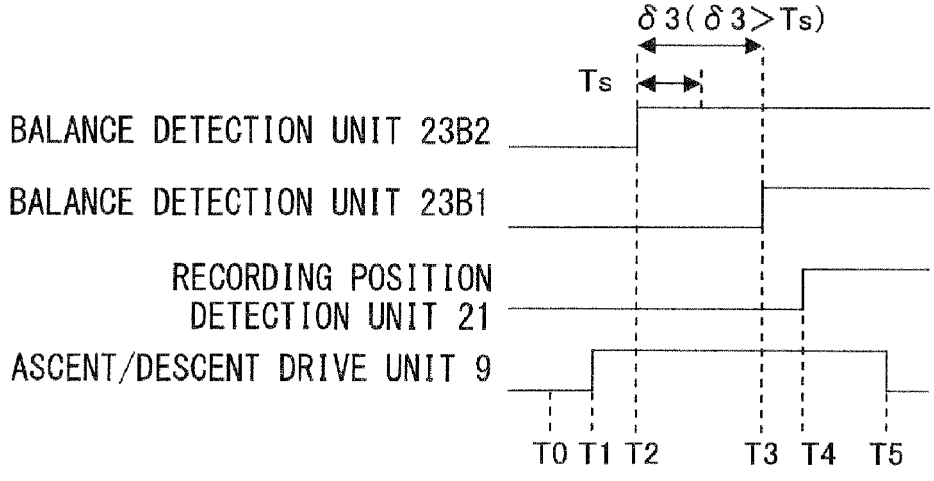

FIG. 10C is an illustrative diagram showing how the transport mechanism 3 is ascending while it is inclined to the far side in the primary scan direction of the image recording apparatus. FIG. 11C is a diagram showing the timing chart for the case of the ascent/descent control unit 20 controlling the ascent/descent mechanism 6 in the state shown in FIG. 10C.

Referring to FIG. 11C, the control unit 18, receiving job information from the host apparatus 41 at the timing T0, starts to obtain the detection results of the balance detection units 23B1 and 23B2 and also instructs the ascent/descent control unit 20 to lift the transport mechanism 3. Having received the instruction, the ascent/descent control unit 20 starts to drive the ascent/descent drive unit 9 at the timing T1.

Then, when the detection result of the balance detection unit 23B2 is turned to ON at the timing T2, the ascent/descent control unit 20 stores the timing T2 in the storage unit 19 and continues to drive the ascent/descent drive unit 9. Upon detecting that the detection result of the balance detection unit 23B1 is turned to ON at the timing T3, the ascent/descent control unit 20 calculates the amount of ascent δ3 of the ascent/descent mechanism 6 in the period between the timings T2 and T3 as a value converted into the number of pulses of the ascent/descent information generation unit 8. Then the ascent/descent control unit 20 compares the aforementioned threshold value Ts with the ascent amount δ3 and validates that the transport mechanism 3 is not balanced because the judgment result is δ3>Ts.

Further, the ascent/descent control unit 20 continues to drive the ascent/descent drive unit 9 even when the event of the transport mechanism 3 reaching the recording position P1 at the timing T4 is detected by receiving the report from the recording position detection unit 21, because the transport mechanism 3 is not balanced. The ascent/descent control unit 20 continues to drive the ascent/descent drive unit 9, thereby the bumping process carried out and shifting the transport mechanism 3 to a balanced state. Then, when the elapsed time from the timing T4 matches the bumping process time, read from the storage unit 19, at the timing T5, the ascent/descent control unit 20 stops driving the ascent/descent drive unit 9 at the present timing T5.

Next is a description of an ascent/descent mechanism control method and a program implementing the method carried out in the image recording apparatus 1 according to the present second embodiment.

Figure 12:
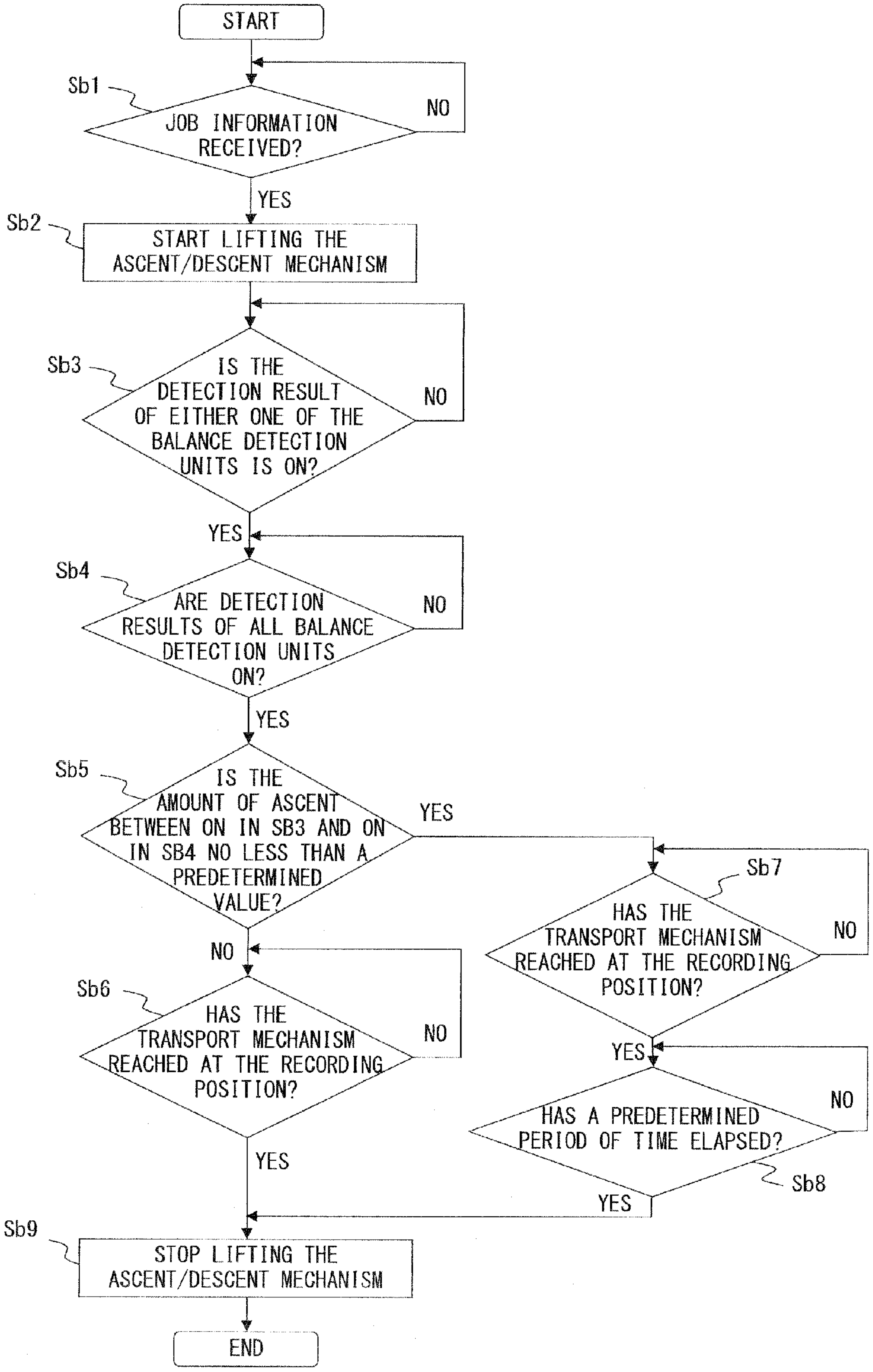
FIG. 12 is a flow chart showing an operation process of an ascent/descent mechanism control method and program according to the second embodiment.

FIG. 12 is a flow chart showing an operation process of an ascent/descent mechanism control method according to the second embodiment. The operation process shown in FIG. 12 is attained by the arithmetic operation processing apparatus of the control unit 18 executing a control program corresponding to the control unit 18.

When the process shown in FIG. 12 is started, first, the control unit 18 judges whether or not job information has been received from the host apparatus 41 in step Sb1. If the judgment result is that such job information has not been received ("no" for step Sb1), the control unit 18 causes the process to stand by in Sb1. If it is judged that there has been a notice of job information, ("yes" for step Sb1), the control unit 18 shifts the process to step Sb2.

Then in step Sb2, the control unit 18 drives the ascent/descent drive unit 9 to start lifting the ascent/descent mechanism 6, and at the same time, monitors the outputs of the balance detection units 23B1 and 23B2.

Then in step Sb3, the control unit 18 waits for the balance detection unit 23B1 or 23B2 to detect the transport mechanism 3 ("no" for step Sb3) and, when either of them detects the transport mechanism 3 ("yes" for step Sb3), stores the timing in this event in the storage unit 19 and also shifts the process to step Sb4.

In step Sb4, the control unit 18 waits for both the balance detection units 23B1 and 23B2 to detect the transport mechanism 3 ("no" for step Sb4). Then, when both the balance detection units 23B1 and 23B2 detect the transport mechanism 3 ("yes" for step Sb4), the control unit 18 obtains a time period between the timing at which either the balance detection unit 23B1 or 23B2 detects the transport mechanism 3 and the timing at which the other thereof detects the transport mechanism 3, in Sb5. Then, the control unit 18 converts the time period into the number of pulses of the ascent/descent information generation unit 8 as the amount of ascent of the transport mechanism 3. If the value of the amount is no less than a predefined value ("yes" for step Sb5), the control unit 18 waits for the transport mechanism 3 to reach the recording position P1 ("no" for step Sb7) because the transport mechanism 3 is not balanced. Then, when it reaches the recording position P1 ("yes" for step Sb7), the control unit 18 waits for a predetermined period of time ("no" for step Sb8) and then shifts the process to step Sb9 when the predetermined period elapses ("yes" for step Sb8).

Meanwhile, in step Sb5, the control unit 18 obtains a period of time between the timing at which either of the balance detection units 23B1 and 23B2 detects the transport mechanism 3 at step Sb3 and the timing at which the other balance detection unit detects it. If the ascent amount of the transport mechanism 3 in the aforementioned period is lower than the predefined value ("no" for step Sb5), the control unit 18 determines that the transport mechanism 3 is balanced and monitors the output of the recording position detection unit 21 in step Sb6. Then the control unit 18 waits for the transport mechanism 3 to reach the recording position P1 ("no" for step Sb6). When the control unit 18 determines that the transport mechanism 3 has reached the recording position P1 ("yes" for step Sb6), it shifts the process to step Sb9.

In step Sb9, the control unit 18 causes the ascent/descent drive unit 9 to stop and then ends the present process.

As described above, the present second embodiment is configured to judge whether or not the transport mechanism 3 is balanced before it reaches the recording position P1, as the first embodiment is configured. Only when the transport mechanism 3 is judged to be unbalanced does the control unit 18 perform a bumping process after the transport mechanism 3 reaches the recording position P1. This configuration makes it possible to perform a control for an ascent/descent mechanism in such a manner as to not levy an excessive load on the ascent/descent motor, ascent/descent wire, or bumping member.

In contrast to the case of the first embodiment, the second embodiment eliminates a need to equip the balance detection unit 23 near to the transport path, thereby allowing a large degree of freedom in designing the image recording apparatus 1*b* and making it possible to configure the apparatus to be compact.

Note that the image recording apparatus according to the second embodiment may be alternatively configured to change a bumping time period after the transport mechanism 3 reaches the recording position P1 in accordance with the difference in the timing of detecting the transport mechanism 3 between the balance detection units 23B1 and 23B2 so that the bumping time period is increased with the aforementioned difference.

Further, another configuration may be such that, if the difference in the timing of detecting the transport mechanism 3 between the balance detection units 23B1 and 23B2 is no less than a predetermined value, the judgment is that the transport mechanism 3 is abnormally inclined so that the ascent/descent process cannot be performed, in which case an ascent/descent mechanism control being disabled is, for example, displayed in a display device (not shown in a drawing herein) or reported in a voice, and then the apparatus is emergency-stopped.

As such, while the preferred embodiments of the present invention have been respectively described, the present invention may be improved and/or modified in various manners possible within the scope and spirit of the present invention, in lieu of being limited to the embodiments described above. For example, some constituent components may be eliminated from the entirety of the configurations put forth in the above described respective embodiments of the present invention, or the different constituent components of the individual embodiments may be appropriately combined.

What is claimed is:

1. An image recording apparatus, comprising:

an image recording unit which has a recording head for performing a recording process by jetting ink into a recording medium;

a transport mechanism which mounts and transports the recording medium;

an ascent/descent mechanism which comprises an ascent/descent drive unit used for moving, by means of winding or unwinding a cable, the transport mechanism between a recording position to which it is moved when the image recording unit performs the recording process and at least one retract position;

a bumping unit which is constituted by a bumping member and a bumped member and which bumps the present bumping member to the bumped member, thereby balancing the transport mechanism;

a balance detection unit which detects the balance of the transport mechanism; and an ascent/descent control unit which judges whether or not a bumping process for balancing the transport mechanism by means of the bumping unit is to be carried out on the basis of the detection result of the balance detection unit when the transport mechanism is moved from the retract position to the recording position.

2. The image recording apparatus according to claim 1, further comprising a control unit comprising at least an arithmetic operation processing unit and a storage unit for pre-storing a control program, wherein the control unit functions as the ascent/descent control unit by causing the arithmetic operation processing unit to execute the control program.

3. The image recording apparatus according to claim 1, further comprising a recording position detection unit which detects that the position of the transport mechanism is at the recording position, wherein the ascent/descent control unit judges whether or not a bumping process for balancing the transport mechanism by means of the bumping unit is to be carried out on the basis of the detection result of the balance detection unit obtained at the point in time at which the recording position detection unit detects that the position of the transport mechanism exists at the recording position.

4. The image recording apparatus according to claim 1, wherein the balance detection unit comprises at least a light emission unit, a light reception unit placed opposite to the light emission unit, a light shield member for shielding the light emitted from the present light emission unit, and a positioning member for locating the light shield member at such a position as to shield the light emitted from the light emission unit when the transport mechanism is balanced.

5. The image recording apparatus according to claim 4, wherein the positioning member is configured to locate itself, by means of a force of gravity, at a position such that the light shield member shields the light emitted from the light emission unit when the transport mechanism is balanced.

6. The image recording apparatus according to claim 4, wherein the transport mechanism further comprises a transport belt which transports the recording medium, wherein the balance detection unit is placed at such a position on the transport mechanism as to not come into contact with the image recording unit when the transport mechanism is positioned at the recording position and as to be apart from the transport belt.

7. The image recording apparatus according to claim 4, wherein the balance detection unit has a moving unit and a fixed unit, which form a pair; each of at least two pairs of the present moving unit and fixed unit is equipped in mutually opposite positions; and the moving units of the present balance detection unit ascend and descend along with the transport mechanism and shield the light emitted from the light emission unit of the balance detection unit when the transport mechanism is located at the recording position.

8. The image recording apparatus according to claim 7, wherein whether or not the transport mechanism is balanced is detected on the basis of a period of time from when the light emitted from the light emission unit is shielded in a first balance detection unit, which is one of the balance detection units, to when the light emitted from the light emission unit is shielded in a second balance detection unit, which is one of the balance detection units and which is placed oppositely to the first balance detection unit.

9. An image recording apparatus, comprising at least:

image recording means having a recording head for performing a recording process by jetting ink onto a recording medium;

transport means for mounting and transporting the recording medium;

ascent/descent means comprising an ascent/descent drive means used for moving, by means of winding or unwinding a cable, the transport means between a recording position to which it is moved when the image recording means performs the recording process and at least one retract position;

bumping means constituted by a bumping member and a bumped member and which bumps the present bumping member to the bumped member, thereby balancing the transport means;

balance detection means for detecting the balance of the transport means; and ascent/descent control means for judging whether or not a bumping process for balancing the transport means by means of the bumping means is to be carried out on the basis of the detection result of the balance detection means when the transport means is moved from the retract position to the recording position.

10. A control method used for an image recording apparatus comprising an image recording unit which has a recording head for performing a recording process by jetting ink onto a recording medium; a transport mechanism which mounts and transports the recording medium; an ascent/descent mechanism which comprises an ascent/descent drive unit used for moving, by means of winding or unwinding a cable, the transport mechanism between a recording position to which it is moved when the image recording unit performs the recording process, and at least one retract position, the method comprising:

detecting whether or not the transport mechanism is balanced when it is moved from the retract position to the recording position; and judging whether or not a bumping process for balancing the transport mechanism is to be carried out, on the basis of the result of the detection.

11. The method according to claim 10, wherein the bumping process is carried out when the transport mechanism reaches the recording position in an unbalanced state.

12. The method according to claim 11, wherein the present bumping process is stopped when the transport mechanism is balanced.

* * * * *